(12) United States Patent
Szczerba et al.

(10) Patent No.: US 12,319,306 B2
(45) Date of Patent: Jun. 3, 2025

(54) DISPLAYING AUTOMATED DRIVING SYSTEM STATUS FOR VEHICLE OCCUPANT AWARENESS

(71) Applicants: GM Global Technology Operations LLC, Detroit, MI (US); Wisconsin Alumni Research Foundation, Madison, WI (US)

(72) Inventors: Joseph F. Szczerba, Grand Blanc, MI (US); Roy J. Mathieu, Rochester Hills, MI (US); Akilesh Rajavenkatanarayanan, Macomb, MI (US); Joonbum Lee, Madison, WI (US); Hansol Rheem, Madison, WI (US); John D. Lee, Madison, WI (US)

(73) Assignees: GM GLOBAL TECHNOLOGY OPERATIONS LLC, Detroit, MI (US); WISCONSIN ALUMNI RESEARCH FOUNDATION, Madison, WI (US)

( * ) Notice: Subject to any disclaimer, the term of this patent is extended or adjusted under 35 U.S.C. 154(b) by 194 days.

(21) Appl. No.: 18/326,270

(22) Filed: May 31, 2023

(65) Prior Publication Data
US 2024/0400078 A1 Dec. 5, 2024

(51) Int. Cl.
*B60W 50/14* (2020.01)
*B60K 35/00* (2006.01)
*B60K 35/23* (2024.01)
*B60K 35/28* (2024.01)
*B60K 35/60* (2024.01)

(52) U.S. Cl.
CPC ............ *B60W 50/14* (2013.01); *B60K 35/00* (2013.01); *B60K 35/23* (2024.01); *B60K 35/28* (2024.01); *B60K 35/60* (2024.01); *B60K 2360/175* (2024.01); *B60K 2360/177* (2024.01); *B60K 2360/785* (2024.01); *B60W 2050/146* (2013.01);
(Continued)

(58) Field of Classification Search
CPC .......... B60W 50/14; B60W 2050/146; B60W 2540/227; B60W 2556/20; B60K 35/00; B60K 35/23; B60K 35/28; B60K 35/60; B60K 2360/175; B60K 2360/177; B60K 2360/785; B60K 35/29; B60K 2360/178; B60K 2360/179
USPC ......................................................... 340/439
See application file for complete search history.

(56) References Cited

U.S. PATENT DOCUMENTS

2010/0253918 A1 10/2010 Seder et al.
2017/0212633 A1 7/2017 You et al.
(Continued)

FOREIGN PATENT DOCUMENTS

DE 102017004859 A1 3/2019

*Primary Examiner* — Omar Casillashernandez
(74) *Attorney, Agent, or Firm* — Vivacqua Crane, PLLC (57) ABSTRACT

A system for providing information to an occupant of a vehicle includes an automated driving system, a display configured to provide information to the occupant, and a controller in electrical communication with the automated driving system and the display. The controller is programmed to determine an automation confidence level for a location of interest using the automated driving system. The location of interest is a location in an environment surrounding the vehicle. The controller is further programmed to notify the occupant using the display based at least in part on the automation confidence level.

21 Claims, 6 Drawing Sheets

(52) U.S. Cl.
CPC ... *B60W 2540/227* (2020.02); *B60W 2556/20* (2020.02)

(56) References Cited

U.S. PATENT DOCUMENTS

| | | | |
|---|---|---|---|
| 2020/0114933 A1* | 4/2020 | Ono | B60K 35/28 |
| 2020/0254877 A1 | 8/2020 | Nakajima et al. | |
| 2021/0155261 A1* | 5/2021 | Caccia Dominioni | B60W 50/02 |
| 2021/0191132 A1 | 6/2021 | Karner et al. | |
| 2021/0229655 A1* | 7/2021 | Amadi | B60W 30/06 |
| 2021/0360211 A1 | 11/2021 | Kawamura | |
| 2022/0009524 A1* | 1/2022 | Oba | B60W 60/0057 |
| 2024/0367667 A1* | 11/2024 | Maniwa | B60K 35/28 |

* cited by examiner

DISPLAYING AUTOMATED DRIVING SYSTEM STATUS FOR VEHICLE OCCUPANT AWARENESS

INTRODUCTION

The present disclosure relates to an augmented reality head-up display for displaying information to an occupant of a vehicle. Augmented reality (AR) involves enhancing the real world with virtual elements that are shown in three-dimensional space and that permit real-time interaction with users. A head-up display (HUD) shows information such as, for example, vehicle speed and navigational instructions, directly onto a windscreen of a vehicle, within the occupant's forward field of view. Accordingly, the head-up display provides occupants with information without looking away from the road. One possible implementation for augmented reality is an augmented reality head-up display (AR-HUD) for a vehicle. By overlaying images on the windscreen, AR-HUDs enhance an occupant's view of the environment outside the vehicle, creating a greater sense of environmental awareness. However, current AR-HUDs may not provide additional information about the operation of vehicle systems and components to occupants.

Therefore, while current augmented reality head-up displays achieve their intended purpose, there is a need in the art for an improved approach for providing information to vehicle occupants.

SUMMARY

According to several aspects, a system for providing information to an occupant of a vehicle is provided. The system includes an automated driving system, a display configured to provide information to the occupant, and a controller in electrical communication with the automated driving system and the display. The controller is programmed to determine an automation confidence level for a location of interest using the automated driving system. The location of interest is a location in an environment surrounding the vehicle. The controller is further programmed to notify the occupant using the display based at least in part on the automation confidence level.

In another aspect of the present disclosure, the system further includes a plurality of vehicle sensors in electrical communication with the controller. To determine the automation confidence level for the location of interest, the controller is further programmed to perform a plurality of measurements of the environment surrounding the vehicle using the plurality of vehicle sensors. To determine the automation confidence level for the location of interest, the controller is further programmed to determine the automation confidence level for the location of interest using the automated driving system based at least in part on the plurality of measurements.

In another aspect of the present disclosure, to determine the automation confidence level for the location of interest using the automated driving system, the controller is further programmed to determine the automation confidence level for the location of interest based at least in part on at least one of an environmental condition and a roadway condition.

In another aspect of the present disclosure, to notify the occupant using the display, the controller is further programmed to display a notification graphic overlayed on the location of interest using the display.

In another aspect of the present disclosure, to display the notification graphic overlayed on the location of interest using the display, the controller is further programmed to compare the automation confidence level for the location of interest to a first automation confidence level threshold. To display the notification graphic overlayed on the location of interest using the display, the controller is further programmed to generate a first graphic in response to determining that the automation confidence level for the location of interest is greater than or equal to the first automation confidence level threshold. To display the notification graphic overlayed on the location of interest using the display, the controller is further programmed to generate a second graphic in response to determining that the automation confidence level for the location of interest is less than the first automation confidence level threshold. To display the notification graphic overlayed on the location of interest using the display, the controller is further programmed to display at least one of the first graphic and the second graphic using the display.

In another aspect of the present disclosure, to display the notification graphic overlayed on the location of interest using the display, the controller is further programmed to compare the automation confidence level for the location of interest to a first automation confidence level threshold. To display the notification graphic overlayed on the location of interest using the display, the controller is further programmed to compare the automation confidence level for the location of interest to a second automation confidence level threshold. To display the notification graphic overlayed on the location of interest using the display, the controller is further programmed to generate a first graphic in response to determining that the automation confidence level for the location of interest is greater than or equal to the first automation confidence level threshold. To display the notification graphic overlayed on the location of interest using the display, the controller is further programmed to generate a second graphic in response to determining that the automation confidence level for the location of interest is less than the second automation confidence level threshold. To display the notification graphic overlayed on the location of interest using the display, the controller is further programmed to generate a third graphic in response to determining that the automation confidence level for the location of interest is less than the first automation confidence level threshold and greater than or equal to the second automation confidence level threshold. To display the notification graphic overlayed on the location of interest using the display, the controller is further programmed to display at least one of the first graphic, the second graphic, and the third graphic using the display.

In another aspect of the present disclosure, the first graphic includes a first distinguishing characteristic, the second graphic includes a second distinguishing characteristic, and the third graphic includes a third distinguishing characteristic. The first, second, and third distinguishing characteristics include at least one of a graphic color, a graphic size, a graphic shape, and a graphic texture. The first, second, and third distinguishing characteristics differ from each other.

In another aspect of the present disclosure, the display is an augmented reality head-up display (AR-HUD) system in electrical communication with the controller. The AR-HUD system includes an occupant position tracking device and an AR-HUD projector. To display at least one of the first graphic, the second graphic, and the third graphic, the controller is further programmed to determine a position of the occupant of the vehicle using the occupant position tracking device. To display at least one of the first graphic, the second graphic, and the third graphic, the controller is further programmed to calculate a size, shape, and location of at least one of the first graphic, the second graphic, and the third graphic based on the position of the occupant and the location of interest. To display at least one of the first graphic, the second graphic, and the third graphic, the controller is further programmed to display at least one of the first graphic, the second graphic, and the third graphic on a windscreen of the vehicle using the augmented reality head up display system based on the size, shape, and location.

In another aspect of the present disclosure, the display further includes a transparent windscreen display (TWD) system in electrical communication with the controller. The transparent windscreen display system includes transparent phosphors embedded in the windscreen of the vehicle and a TWD projector. To display at least one of the first graphic, the second graphic, and the third graphic, the controller is further programmed to calculate a size, shape, and location of at least one of the first graphic, the second graphic, and the third graphic based on the location of interest. To display at least one of the first graphic, the second graphic, and the third graphic, the controller is further programmed to display at least one of the first graphic, the second graphic, and the third graphic on the windscreen of the vehicle using the TWD system based on the size, shape, and location.

In another aspect of the present disclosure, the automated driving system is configured to be used in at least one of a manual operation mode, a partially automated operation mode, and a fully automated operation mode.

According to several aspects, a method for providing information to an occupant of a vehicle is provided. The method includes determining an automation confidence level for a location of interest using the automated driving system. The location of interest is a location in an environment surrounding the vehicle. The method also includes notifying the occupant using a display based at least in part on the automation confidence level.

In another aspect of the present disclosure, determining the automation confidence level for the location of interest further may include performing a plurality of measurements of the environment surrounding the vehicle using a plurality of vehicle sensors. Determining the automation confidence level for the location of interest further may include determining the automation confidence level for the location of interest using the automated driving system based at least in part on the plurality of measurements.

In another aspect of the present disclosure, determining the automation confidence level for the location of interest further may include determining the automation confidence level for the location of interest based at least in part on at least one of a traffic condition in the environment surrounding the vehicle, a pedestrian presence in the environment surrounding the vehicle, and a roadway condition in the environment surrounding the vehicle.

In another aspect of the present disclosure, notifying the occupant using the display further may include displaying a notification graphic overlayed on the location of interest using the display.

In another aspect of the present disclosure, displaying the notification graphic overlayed on the location of interest using the display further may include comparing the automation confidence level for the location of interest to a first automation confidence level threshold. Displaying the notification graphic overlayed on the location of interest using the display further may include generating a first graphic in response to determining that the automation confidence level for the location of interest is greater than or equal to the first automation confidence level threshold. Displaying the notification graphic overlayed on the location of interest using the display further may include generating a second graphic in response to determining that the automation confidence level for the location of interest is less than the first automation confidence level threshold. Displaying the notification graphic overlayed on the location of interest using the display further may include displaying at least one of the first graphic and the second graphic using the display.

In another aspect of the present disclosure, displaying the notification graphic overlayed on the location of interest using the display further may include comparing the automation confidence level for the location of interest to a first automation confidence level threshold. Displaying the notification graphic overlayed on the location of interest using the display further may include comparing the automation confidence level for the location of interest to a second automation confidence level threshold. Displaying the notification graphic overlayed on the location of interest using the display further may include generating a first graphic in response to determining that the automation confidence level for the location of interest is greater than or equal to the first automation confidence level threshold. Displaying the notification graphic overlayed on the location of interest using the display further may include generating a second graphic in response to determining that the automation confidence level for the location of interest is less than the second automation confidence level threshold. Displaying the notification graphic overlayed on the location of interest using the display further may include generating a third graphic in response to determining that the automation confidence level for the location of interest is less than the first automation confidence level threshold and greater than or equal to the second automation confidence level threshold. Displaying the notification graphic overlayed on the location of interest using the display further may include displaying at least one of the first graphic, the second graphic, and the third graphic using the display.

In another aspect of the present disclosure, displaying at least one of the first graphic, the second graphic, and the third graphic further may include determining a position of a driver of the vehicle using a driver position tracking device. Displaying at least one of the first graphic, the second graphic, and the third graphic further may include calculating a size, shape, and location of at least one of the first graphic, the second graphic, and the third graphic based on the position of the driver and the location of interest. Displaying at least one of the first graphic, the second graphic, and the third graphic further may include displaying at least one of the first graphic, the second graphic, and the third graphic on a windscreen of the vehicle using an augmented reality head up display projector based on the size, shape, and location. Displaying at least one of the first graphic, the second graphic, and the third graphic further may include displaying at least one of the first graphic, the second graphic, and the third graphic on the windscreen of the vehicle using a transparent windscreen display (TWD) system based on the size, shape, and location.

According to several aspects, a system for providing information to an occupant of a vehicle is provided. The system includes an automated driving system, an augmented reality head-up display (AR-HUD), a plurality of vehicle sensors, and a controller in electrical communication with the automated driving system, the AR-HUD, and the plurality of vehicle sensors. The controller is programmed to perform a plurality of measurements of an environment surrounding the vehicle using the plurality of vehicle sensors. The plurality of measurements includes at least one of a traffic condition in the environment surrounding the vehicle, a pedestrian presence in the environment surrounding the vehicle, and a roadway condition in the environment surrounding the vehicle. The controller is further programmed to determine an automation confidence level for a location of interest using the automated driving system based at least in part on the plurality of measurements. The controller is further programmed to notify the occupant using the AR-HUD based at least in part on the automation confidence level.

In another aspect of the present disclosure, to notify the occupant using the AR-HUD, the controller is further programmed to compare the automation confidence level for the location of interest to a first automation confidence level threshold. To notify the occupant using the AR-HUD, the controller is further programmed to compare the automation confidence level for the location of interest to a second automation confidence level threshold. To notify the occupant using the AR-HUD, the controller is further programmed to generate a first graphic in response to determining that the automation confidence level for the location of interest is greater than or equal to the first automation confidence level threshold. To notify the occupant using the AR-HUD, the controller is further programmed to generate a second graphic in response to determining that the automation confidence level for the location of interest is less than the second automation confidence level threshold. To notify the occupant using the AR-HUD, the controller is further programmed to generate a third graphic in response to determining that the automation confidence level for the location of interest is less than the first automation confidence level threshold and greater than or equal to the second automation confidence level threshold. To notify the occupant using the AR-HUD, the controller is further programmed to display at least one of the first graphic, the second graphic, and the third graphic using the display.

In another aspect of the present disclosure, the first graphic includes a first distinguishing characteristic, the second graphic includes a second distinguishing characteristic, and the third graphic includes a third distinguishing characteristic. The first, second, and third distinguishing characteristics include at least one of a graphic color, a graphic size, a graphic shape, and a graphic texture. The first, second, and third distinguishing characteristics differ from each other.

Further areas of applicability will become apparent from the description provided herein. It should be understood that the description and specific examples are intended for purposes of illustration only and are not intended to limit the scope of the present disclosure.

BRIEF DESCRIPTION OF THE DRAWINGS

The drawings described herein are for illustration purposes only and are not intended to limit the scope of the present disclosure in any way.

DETAILED DESCRIPTION

The following description is merely exemplary in nature and is not intended to limit the present disclosure, application, or uses.

Automated driving systems with various levels of capability may be used in vehicles. In a non-limiting example, automated driving systems may be configured to provide visual, audible, and/or haptic feedback to vehicle occupants to assist in the driving task. In a non-limiting example, automated driving systems may be configured to control some or all systems of the vehicle in certain circumstances to provide a partially automated driving experience. In yet another non-limiting example, automated driving systems may be configured to fully control the vehicle. Automated driving systems may provide a confidence value indicating the capability of the automated driving system to control the vehicle at any given location. The present disclosure provides a new and improved system and method to visually provide information about the confidence of the automated driving system to the occupant, increasing occupant awareness.

Figure 1:
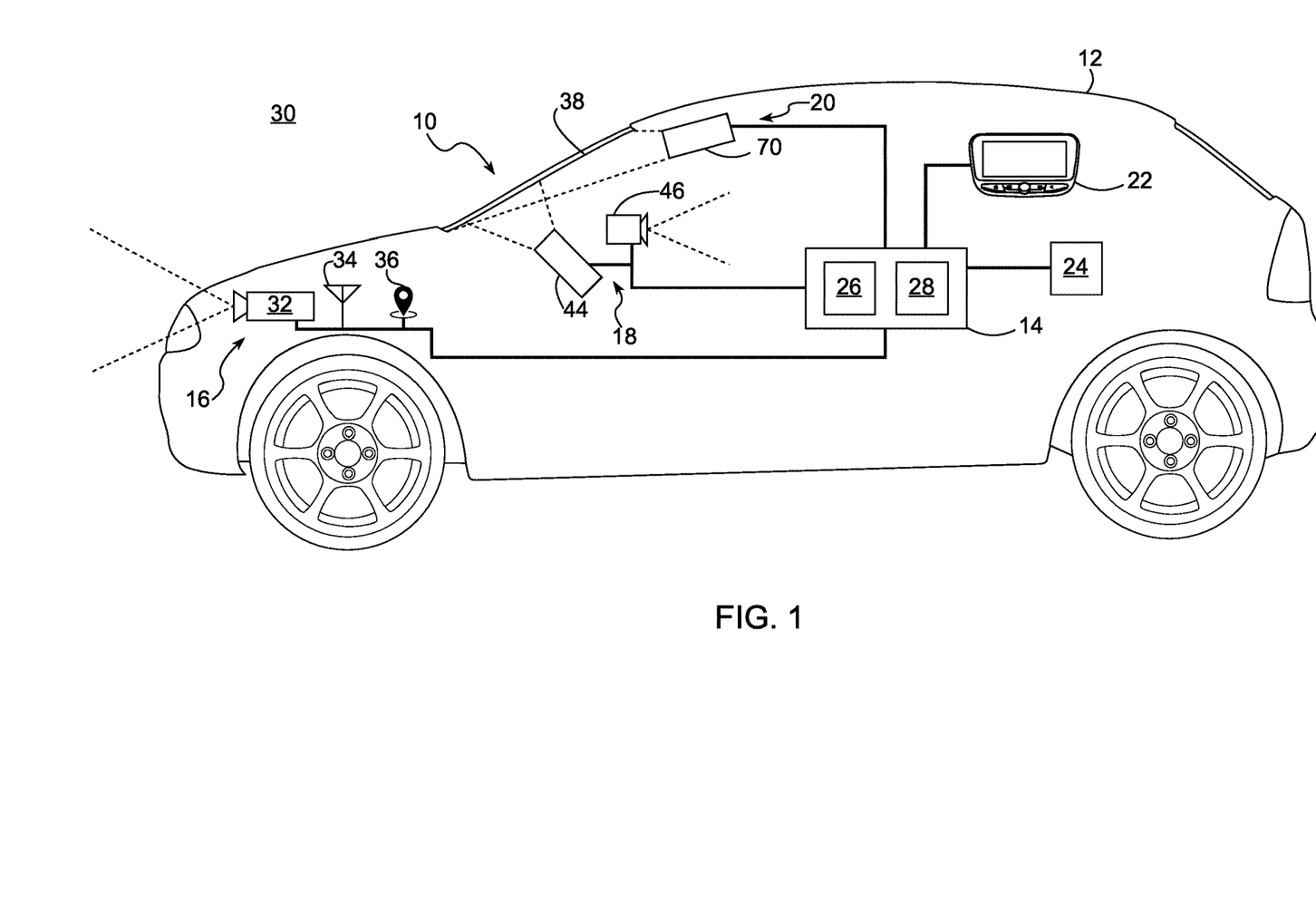
FIG. 1 is a schematic diagram of a system for providing information to an occupant of a vehicle, according to an exemplary embodiment.

Referring to FIG. 1, a system for providing information to an occupant of a vehicle is illustrated and generally indicated by reference number 10. The system 10 is shown with an exemplary vehicle 12. While a passenger vehicle is illustrated, it should be appreciated that the vehicle 12 may be any type of vehicle without departing from the scope of the present disclosure. The system 10 generally includes a controller 14, a plurality of vehicle sensors 16, an augmented reality head-up display (AR-HUD) system 18, a transparent windscreen display (TWD) system 20, a human-machine interface (HMI) 22, and an automated driving system 24.

The controller 14 is used to implement a method 100 for providing information to an occupant of a vehicle, as will be described below. The controller 14 includes at least one processor 26 and a non-transitory computer readable storage device or media 28. The processor 26 may be a custom made or commercially available processor, a central processing unit (CPU), a graphics processing unit (GPU), an auxiliary processor among several processors associated with the controller 14, a semiconductor-based microprocessor (in the form of a microchip or chip set), a macroprocessor, a combination thereof, or generally a device for executing instructions. The computer readable storage device or media 28 may include volatile and nonvolatile storage in read-only memory (ROM), random-access memory (RAM), and keep-alive memory (KAM), for example. KAM is a persistent or nonvolatile memory that may be used to store various operating variables while the processor 26 is powered down. The computer-readable storage device or media 28 may be implemented using a number of memory devices such as PROMs (programmable read-only memory), EPROMs (electrically PROM), EEPROMs (electrically erasable PROM), flash memory, or another electric, magnetic, optical, or combination memory devices capable of storing data, some of which represent executable instructions, used by the controller 14 to control various systems of the vehicle 12. The controller 14 may also consist of multiple controllers which are in electrical communication with each other. The controller 14 may be inter-connected with additional systems and/or controllers of the vehicle 12, allowing the controller 14 to access data such as, for example, speed, acceleration, braking, and steering angle of the vehicle 12.

The controller 14 is in electrical communication with the plurality of vehicle sensors 16, the AR-HUD system 18, the TWD system 20, the HMI 22, and the automated driving system 24. In an exemplary embodiment, the electrical communication is established using, for example, a CAN network, a FLEXRAY network, a local area network (e.g., WiFi, ethernet, and the like), a serial peripheral interface (SPI) network, or the like. It should be understood that various additional wired and wireless techniques and communication protocols for communicating with the controller 14 are within the scope of the present disclosure.

The plurality of vehicle sensors 16 are used to acquire information about an environment 30 surrounding the vehicle 12. In an exemplary embodiment, the plurality of vehicle sensors 16 includes at least a camera system 32, a vehicle communication system 34, and a global navigation satellite system (GNSS) 36.

In another exemplary embodiment, the plurality of vehicle sensors 16 further includes sensors to determine performance data about the vehicle 12. In an exemplary embodiment, the plurality of vehicle sensors 16 further includes at least one of a motor speed sensor, a motor torque sensor, an electric drive motor voltage and/or current sensor, an accelerator pedal position sensor, a coolant temperature sensor, a cooling fan speed sensor, and a transmission oil temperature sensor.

In another exemplary embodiment, the plurality of vehicle sensors 16 further includes sensors to determine information about the environment within the vehicle 12, such as, for example, a seat occupancy sensor, a cabin air temperature sensor, a cabin motion detection sensor, a cabin camera, a cabin microphone, and/or the like.

In another exemplary embodiment, the plurality of vehicle sensors 16 further includes sensors to determine information about the environment surrounding the vehicle 12, for example, an ambient air temperature sensor, a barometric pressure sensor, and/or a photo and/or video camera which is positioned to view the environment in front of the vehicle 12.

In another exemplary embodiment, at least one of the plurality of vehicle sensors 16 is capable of measuring distances in the environment surrounding the vehicle 12. In a non-limiting example, the plurality of vehicle sensors 16 includes a stereoscopic camera having distance measurement capabilities. In one example, at least one of the plurality of vehicle sensors 16 is affixed inside of the vehicle 12, for example, in a headliner of the vehicle 12, having a view through a windscreen of the vehicle 12. In another example, at least one of the plurality of vehicle sensors 16 is affixed outside of the vehicle 12, for example, on a roof of the vehicle 12, having a view of the environment surrounding the vehicle 12. It should be understood that various additional types of vehicle sensors, such as, for example, LiDAR sensors, ultrasonic ranging sensors, radar sensors, and/or time-of-flight sensors are within the scope of the present disclosure. The plurality of vehicle sensors 16 are in electrical communication with the controller 14 as discussed above.

The camera system 32 is used to capture images and/or videos of the environment 30 surrounding the vehicle 12. In an exemplary embodiment, the camera system 32 includes a photo and/or video camera which is positioned to view the environment 30 surrounding the vehicle 12. In a non-limiting example, the camera system 32 includes a camera affixed inside of the vehicle 12, for example, in a headliner of the vehicle 12, having a view through a windscreen 38. In another non-limiting example, the camera system 32 includes a camera affixed outside of the vehicle 12, for example, on a roof of the vehicle 12, having a view of the environment 30 in front of the vehicle 12.

In another exemplary embodiment, the camera system 32 is a surround view camera system including a plurality of cameras (also known as satellite cameras) arranged to provide a view of the environment 30 adjacent to all sides of the vehicle 12. In a non-limiting example, the camera system 32 includes a front-facing camera (mounted, for example, in a front grille of the vehicle 12), a rear-facing camera (mounted, for example, on a rear tailgate of the vehicle 12), and two side-facing cameras (mounted, for example, under each of two side-view mirrors of the vehicle 12). In another non-limiting example, the camera system 32 further includes an additional rear-view camera mounted near a center high mounted stop lamp of the vehicle 12.

It should be understood that camera systems having additional cameras and/or additional mounting locations are within the scope of the present disclosure. It should further be understood that cameras having various sensor types including, for example, charge-coupled device (CCD) sensors, complementary metal oxide semiconductor (CMOS) sensors, and/or high dynamic range (HDR) sensors are within the scope of the present disclosure. Furthermore, cameras having various lens types including, for example, wide-angle lenses and/or narrow-angle lenses are also within the scope of the present disclosure.

The vehicle communication system 34 is used by the controller 14 to communicate with other systems external to the vehicle 12. For example, the vehicle communication system 34 includes capabilities for communication with vehicles ("V2V" communication), infrastructure ("V2I" communication), remote systems at a remote call center (e.g., ON-STAR by GENERAL MOTORS) and/or personal devices. In general, the term vehicle-to-everything communication ("V2X" communication) refers to communication between the vehicle 12 and any remote system (e.g., vehicles, infrastructure, and/or remote systems). In certain embodiments, the vehicle communication system 34 is a wireless communication system configured to communicate via a wireless local area network (WLAN) using IEEE 802.11 standards or by using cellular data communication (e.g., using GSMA standards, such as, for example, SGP.02, SGP.22, SGP.32, and the like). Accordingly, the vehicle communication system 34 may further include an embedded universal integrated circuit card (eUICC) configured to store at least one cellular connectivity configuration profile, for example, an embedded subscriber identity module (eSIM) profile. The vehicle communication system 34 is further configured to communicate via a personal area network (e.g., BLUETOOTH) and/or near-field communication (NFC). However, additional or alternate communication methods, such as a dedicated short-range communications (DSRC) channel and/or mobile telecommunications protocols based on the 3rd Generation Partnership Project (3GPP) standards, are also considered within the scope of the present disclosure. DSRC channels refer to one-way or two-way short-range to medium-range wireless communication channels specifically designed for automotive use and a corresponding set of protocols and standards. The 3GPP refers to a partnership between several standards organizations which develop protocols and standards for mobile telecommunications. 3GPP standards are structured as "releases". Thus, communication methods based on 3GPP release 14, 15, 16 and/or future 3GPP releases are considered within the scope of the present disclosure. Accordingly, the vehicle communication system 34 may include one or more antennas and/or communication transceivers for receiving and/or transmitting signals, such as cooperative sensing messages (CSMs). The vehicle communication system 34 is configured to wirelessly communicate information between the vehicle 12 and another vehicle. Further, the vehicle communication system 34 is configured to wirelessly communicate information between the vehicle 12 and infrastructure or other vehicles. It should be understood that the vehicle communication system 34 may be integrated with the controller 14 (e.g., on a same circuit board with the controller 14 or otherwise a part of the controller 14) without departing from the scope of the present disclosure.

The GNSS 36 is used to determine a geographical location of the vehicle 12. In an exemplary embodiment, the GNSS 36 is a global positioning system (GPS). In a non-limiting example, the GPS includes a GPS receiver antenna (not shown) and a GPS controller (not shown) in electrical communication with the GPS receiver antenna. The GPS receiver antenna receives signals from a plurality of satellites, and the GPS controller calculates the geographical location of the vehicle 12 based on the signals received by the GPS receiver antenna. In an exemplary embodiment, the GNSS 36 additionally includes a map. The map includes information about infrastructure such as municipality borders, roadways, railways, sidewalks, buildings, and the like. Therefore, the geographical location of the vehicle 12 is contextualized using the map information. In a non-limiting example, the map is retrieved from a remote source using a wireless connection. In another non-limiting example, the map is stored in a database of the GNSS 36. It should be understood that various additional types of satellite-based radionavigation systems, such as, for example, the Global Positioning System (GPS), Galileo, GLONASS, and the BeiDou Navigation Satellite System (BDS) are within the scope of the present disclosure. It should be understood that the GNSS 36 may be integrated with the controller 14 (e.g., on a same circuit board with the controller 14 or otherwise a part of the controller 14) without departing from the scope of the present disclosure.

Figure 2:
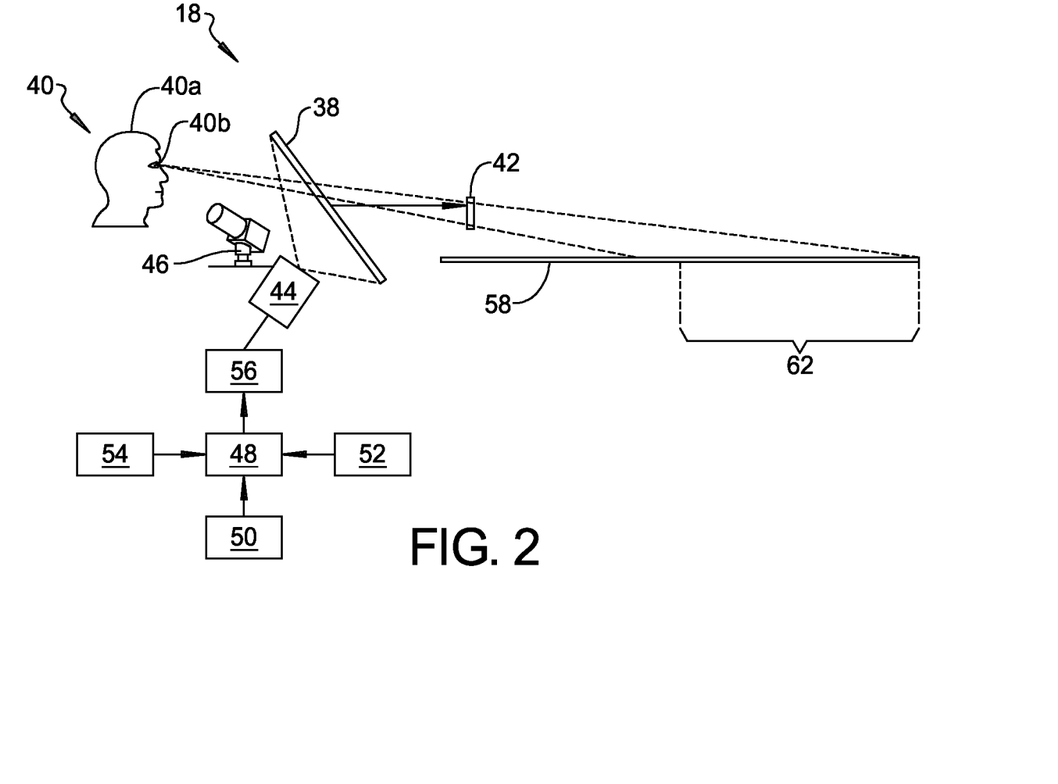
FIG. 2 is a schematic diagram of an AR-HUD system for use by an exemplary occupant, according to an exemplary embodiment.

Referring to FIG. 2, a system diagram of the AR-HUD system 18 for use by an exemplary occupant 40 is shown. In the scope of the present disclosure, the occupant 40 includes, in a non-limiting example, a driver, a passenger, and/or any additional persons in the vehicle 12. The AR-HUD system 18 is used to display AR-HUD graphics 42 (i.e., notification symbols providing visual information to the occupant 40) on the windscreen 38 of the vehicle 12. The AR-HUD system 18 includes an AR-HUD projector 44 and an occupant position tracking device 46. The AR-HUD system 18 is in electrical communication with the controller 14 as discussed above.

The AR-HUD projector 44 is used to project the AR-HUD graphics 42 on the windscreen 38 of the vehicle 12. It should be understood that various devices designed to project images including, for example, optical collimators, laser projectors, digital light projectors (DLP), and the like are within the scope of the present disclosure.

The occupant position tracking device 46 is used to determine a position of the occupant 40 in the vehicle 12. For example, the occupant position tracking device 46 may track a position of a head 40a or eyes 40b of the occupant 40. The position of the occupant 40 in the vehicle 12 from the occupant position tracking device 46 is used to locate the AR-HUD graphic 42 on the windscreen 38 of the vehicle 12. In an exemplary embodiment, the occupant position tracking device 46 is one or more cameras disposed in the vehicle 12.

To operate the AR-HUD system 18, the controller 14 includes multiple software modules, including a system manager 48. During operation of the system 10, the system manager 48 receives at least a first input 50, a second input 52, and a third input 54. The first input 50 is indicative of the location of the vehicle 12 in space (i.e., the geographical location of the vehicle 12), the second input 52 is indicative of the vehicle occupant 40 position in the vehicle 12 (e.g., the position of the eyes and/or head of the occupant 40 in the vehicle 12), and the third input 54 is data pertaining to an automation confidence level in the environment 30 surrounding the vehicle 12, as will be discussed in greater detail below. The first input 50 may include data such as GNSS data (e.g., GPS data), vehicle speed, roadway curvature, and vehicle steering, and this data is collected from the plurality of vehicle sensors 16. The second input 52 is received from the occupant position tracking device 46. The third input 54 is data pertaining to the automation confidence level in the environment 30 surrounding the vehicle 12. The system manager 48 is configured to determine (e.g., compute) the type, size, shape, and color of the AR-HUD graphics 42 to be displayed using the AR-HUD projector 44 based on the first input 50 (i.e., the vehicle location in the environment 30), the second input 52 (e.g., the position of the eyes 40b and/or head 40a of the occupant 40 in the vehicle 12), and the third input 54 (i.e. the automation confidence level in the environment 30 surrounding the vehicle 12) The system manager 48 instructs an image engine 56, which is a software module or an integrated circuit of the AR-HUD projector 44 or the controller 14, to display the AR-HUD graphic 42 using the AR-HUD projector 44. The image engine 56 displays the AR-HUD graphic 42 on the windscreen 38 of the vehicle 12 using the AR-HUD projector 44 based on the type, size, shape, and color of the AR-HUD graphic 42 determined by the system manager 48. The AR-HUD graphic 42 is projected on the windscreen 38 by the AR-HUD projector 44 to show the AR-HUD graphic 42 along a roadway surface 58.

Figure 3:
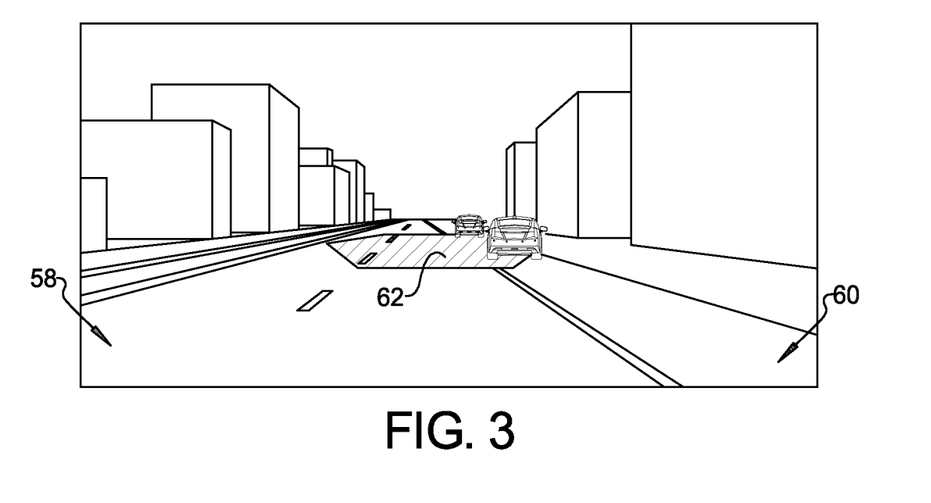
FIG. 3 is a schematic front view of a dual-focal plane augmented reality display, highlighting a second image plane of the dual-focal plane augmented reality display, according to an exemplary embodiment.
Figure 4:
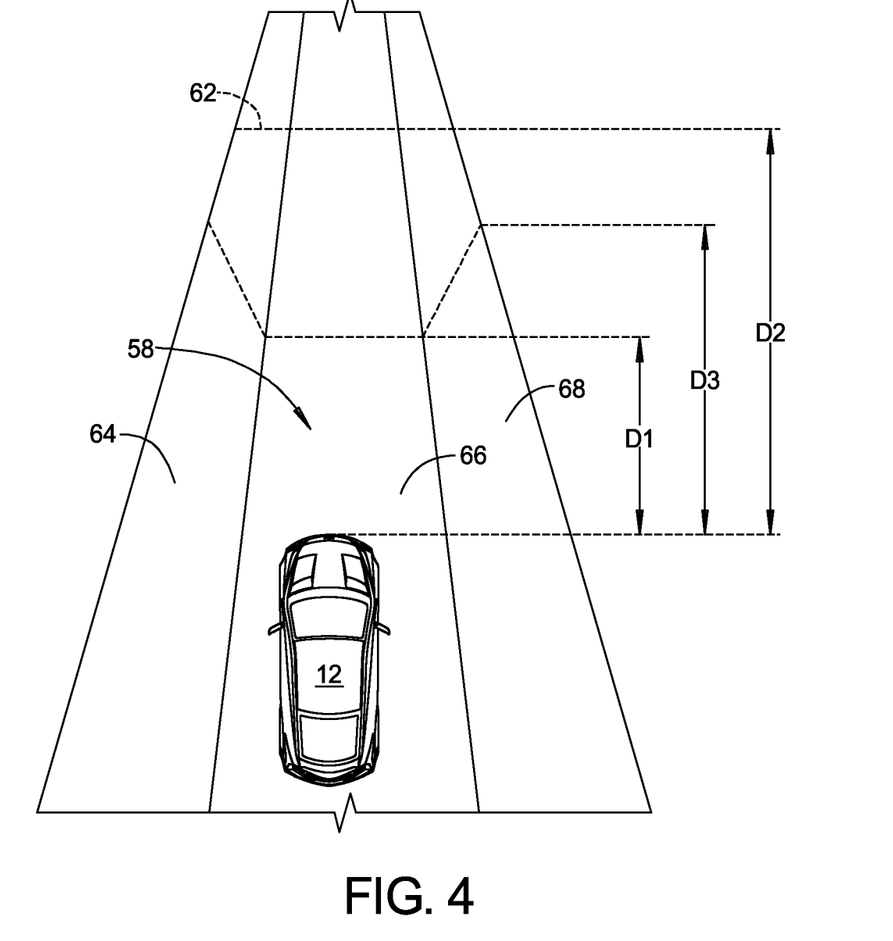
FIG. 4 is a schematic diagram of the second image plane of the dual-focal plane augmented reality display, according to an exemplary embodiment.

In the exemplary embodiment of the present disclosure, the AR-HUD system 18 is a dual-focal plane AR-HUD system. With reference to FIGS. 3 and 4 and with continued reference to FIG. 2, the AR-HUD system 18 has a first image plane 60 and a second image plane 62. The first image plane 60 shows the view of the outside world, and the second image plane 62 is reserved for displaying the AR-HUD graphics 42. The second image plane 62 spans multiple lanes and the AR-HUD graphics 42 appear at a location farther on a roadway surface 58 relative to the first image plane 60. For instance, as shown in FIGS. 3 and 4, the second image plane 62 covers a left lane 64, a central lane 66, and a right lane 68. As a non-limiting example, in the central lane 66, the second image plane 62 starts at a first predetermined distance D1 (e.g., twenty-five meters) from the vehicle 12 and ends at a second predetermined distance D2 (e.g., ninety meters) from the vehicle 12. Regardless of the specific distances, the second predetermined distance D2 is greater than the first predetermined distance D1 to help the occupant 40 see the AR-HUD graphics 42 displayed using the AR- HUD projector 44. In the left lane 64 and the right lane 68, the second image plane 62 is delimited by a sloped boundary that starts at the first predetermined distance D1 from the vehicle 12 and ends at a third predetermined distance D3 (e.g., fifty meters) from the vehicle 12. The third predetermined distance D3 is greater than the first predetermined distance D1 and less than the second predetermined distance D2 to help the occupant 40 see the AR-HUD graphics 42 displayed using the AR-HUD projector 44. As used herein, the term "dual-focal plane AR-HUD" means an AR-HUD system that presents images in a first image plane and a second image plane, wherein the first image plane and the second image plane are at different locations. It is desirable to configure the AR-HUD system 18 as a dual-focal plane AR-HUD to facilitate manipulation of the AR-HUD graphics 42 on the view of the outside word. For instance, by using a dual-focal plane AR-HUD, the size, location, and characteristics of the AR-HUD graphics 42 may be changed based on, for example, the location of the eyes 40b of the occupant 40.

The TWD system 20 is used to display images on the windscreen 38 of the vehicle 12. In an exemplary embodiment, the AR-HUD system 18 can display the AR-HUD graphics 42 in a predefined region of the windscreen 38 (e.g., in the first image plane 60 and the second image plane 62). The TWD system 20 can display TWD graphics (not shown) in any region of the windscreen 38. Therefore, by operating the AR-HUD system 18 and the TWD system 20 in conjunction, the controller 14 may display graphics in any region of the windscreen 38. In an exemplary embodiment, the TWD system 20 includes transparent phosphors (not shown) embedded into the windscreen 38 and a TWD projector 70 (FIG. 1). The TWD system 20 is in electrical communication with the controller 14 as discussed above.

The transparent phosphors are light emitting particles which fluoresce in response to being excited by the TWD projector 70. In an exemplary embodiment, the transparent phosphors are red, green, and blue (RGB) phosphors, allowing full color operation of the TWD system 20. The use of monochrome and/or two-color phosphors is also within the scope of the present disclosure. When excitation light is absorbed by the transparent phosphors, visible light is emitted by the transparent phosphors. The excitation light may be, for example, violet light in the visible spectrum (ranging from about 380 to 450 nanometers) and/or ultraviolet light.

The TWD projector 70 is used to excite the transparent phosphors in a predetermined pattern to produce the TWD graphics on the windscreen 38. In an exemplary embodiment, the TWD projector 70 is a violet/ultraviolet laser projector disposed proximally to the headliner of the vehicle 12. The TWD projector 70 includes three lasers, each laser configured to excite one of the red, green, or blue transparent phosphors.

In an exemplary embodiment, the HMI 22 is used in addition to the AR-HUD system 18 and the TWD system 20 to display information to the occupant 40 of the vehicle 12. In another exemplary embodiment, the HMI 22 is used instead of the AR-HUD system 18 and/or the TWD system 20 to display information to the occupant 40 of the vehicle 12. In the aforementioned exemplary embodiments, the HMI 22 is a display system located in view of the occupant 40 and capable of displaying text, graphics, and/or images. It is to be understood that HMI display systems including LCD displays, LED displays, and the like are within the scope of the present disclosure. Further exemplary embodiments where the HMI 22 is disposed in a rearview mirror are also within the scope of the present disclosure. The HMI 22 is in electrical communication with the controller 14 as discussed above.

The automated driving system 24 is used to provide assistance to the occupant 40 to increase occupant awareness and/or control behavior of the vehicle 12. In the scope of the present disclosure, the automated driving system 24 encompasses systems which provide any level of assistance to the occupant 40 (e.g., blind spot warning, lane departure warning, and/or the like) and systems which are capable of autonomously driving the vehicle 12 under some or all conditions. It should be understood that all levels of driving automation defined by, for example, SAE J3016 (i.e., SAE LEVEL 0, SAE LEVEL 1, SAE LEVEL 2, SAE LEVEL 3, SAE LEVEL 4, and SAE LEVEL 5) are within the scope of the present disclosure.

In an exemplary embodiment, the automated driving system 24 is configured to detect and/or receive information about the environment 30 surrounding the vehicle 12 and process the information to provide assistance to the occupant 40. In some embodiments, the automated driving system 24 is a software module executed on the controller 14. In other embodiments, the automated driving system 24 includes a separate automated driving system controller, similar to the controller 14, capable of processing the information about the environment 30 surrounding the vehicle 12. In an exemplary embodiment, the automated driving system 24 may operate in a manual operation mode, a partially automated operation mode, and a fully automated operation mode.

In the scope of the present disclosure, the manual operation mode means that the automated driving system 24 provides warnings or notifications to the occupant 40 but does not intervene or control the vehicle 12 directly. In a non-limiting example, the automated driving system 24 receives information from the plurality of vehicle sensors 16. Using techniques such as, for example, computer vision, the automated driving system 24 understands the environment 30 surrounding the vehicle 12 and provides assistance to the occupant 40. For example, if the automated driving system 24 identifies, based on data from the plurality of vehicle sensors 16, that the vehicle 12 is likely to collide with a remote vehicle, the automated driving system 24 may use the HMI 22, the AR-HUD system 18 and/or TWD system 20 to provide a warning to the occupant 40.

In the scope of the present disclosure, the partially automated operation mode means that the automated driving system 24 provides warnings or notifications to the occupant 40 and may intervene or control the vehicle 12 directly in certain situations. In a non-limiting example, the automated driving system 24 is additionally in electrical communication with components of the vehicle 12 such as a brake system, a propulsion system, and/or a steering system of the vehicle 12, such that the automated driving system 24 may control the behavior of the vehicle 12. In a non-limiting example, the automated driving system 24 may control the behavior of the vehicle 12 by applying brakes of the vehicle 12 to avoid an imminent collision.

In the scope of the present disclosure, the fully automated operation mode means that the automated driving system 24 uses data from the plurality of vehicle sensors 16 to understand the environment 30 and control the vehicle 12 to drive the vehicle 12 to a predetermined destination without a need for control or intervention by the occupant 40.

For a given location in the environment 30 surrounding the vehicle 12 (also referred to as a location of interest), the automated driving system 24 determines an automation confidence level. In the scope of the present disclosure, the automation confidence level quantifies a confidence with which the automated driving system 24 may notify the occupant 40 and/or control the vehicle 12 at the given location (i.e., the location of interest). For example, if the automation confidence level is high (e.g., close to one) for the location of interest, the automated driving system 24 has determined that the automated driving system 24 is highly likely to be able to control the vehicle 12 at the location of interest. If the automation confidence level is low (e.g., close to zero) for the location of interest, the automated driving system 24 has determined that the automated driving system 24 is highly unlikely to be able to control the vehicle 12 at the location of interest, and that intervention from the occupant 40 is required. The automated driving system 24 may use the automation confidence level to determine whether the occupant 40 must take control of the vehicle 12. The automation confidence level will be discussed in greater detail below.

In an exemplary embodiment, the automated driving system 24 operates using a machine learning algorithm trained to output control signals for the vehicle 12 based on input data collected from the plurality of vehicle sensors 16. In another exemplary embodiment, the automated driving system 24 operates using a deterministic algorithm which has been programmed to output control signals for the vehicle 12 based on data collected from the plurality of vehicle sensors 16. It should be understood that the automated driving system 24 may be any software and/or hardware module configured to operate in the manual operation mode, the partially automated operation mode, or the fully automated operation mode as described above.

Figure 5:
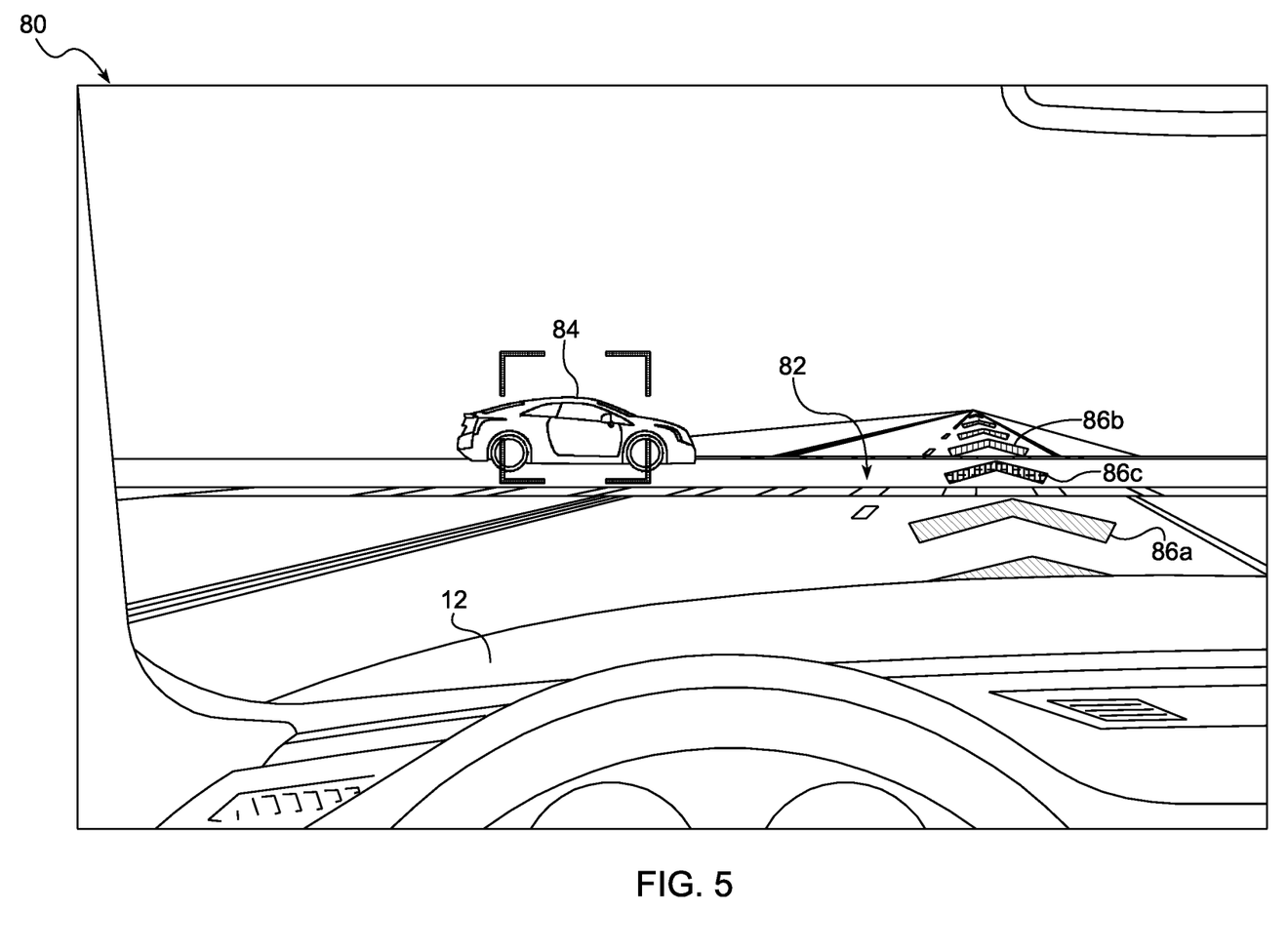
FIG. 5 is a first exemplary driving scene, according to an exemplary embodiment.

Referring to FIG. 5, a first exemplary driving scene 80 showing the system 10 and method 100 in use is shown. The first exemplary driving scene 80 includes an intersection 82 in the path of the vehicle 12. The first exemplary driving scene 80 further includes a remote vehicle 84 traversing the intersection 82. The system 10 and method 100 are used to produce a first graphic 86*a*, a second graphic 86*b*, and a third graphic 86*c*. The first graphic 86*a*, the second graphic 86*b*, and the third graphic 86*c* are overlayed on locations (i.e., locations of interest) of the environment 30 based on the automation confidence level. Generation and display of the first graphic 86*a*, the second graphic 86*b*, and the third graphic 86*c* will be discussed in greater detail below. In an exemplary embodiment, the first graphic 86*a* includes a first distinguishing characteristic, the second graphic 86*b* includes a second distinguishing characteristic, and the third graphic 86*c* includes a third distinguishing characteristic. In a non-limiting example, the first, second, and third distinguishing characteristics are at least one of a graphic color, a graphic size, a graphic shape, and/or a graphic texture. The first, second, and third distinguishing characteristics are used to allow the occupant 40 to distinguish between the first graphic 86*a*, the second graphic 86*b*, and the third graphic 86*c*. In the exemplary embodiment shown in FIG. 5, the first, second, and third distinguishing characteristics are the graphic color. Therefore, the first graphic 86*a* is green, the second graphic 86*b* is red, and the third graphic 86*c* is yellow. It should be understood that use of alternative colors, such as, for example, blue, vermilion, and/or the like are within the scope of the present disclosure.

Figure 6:
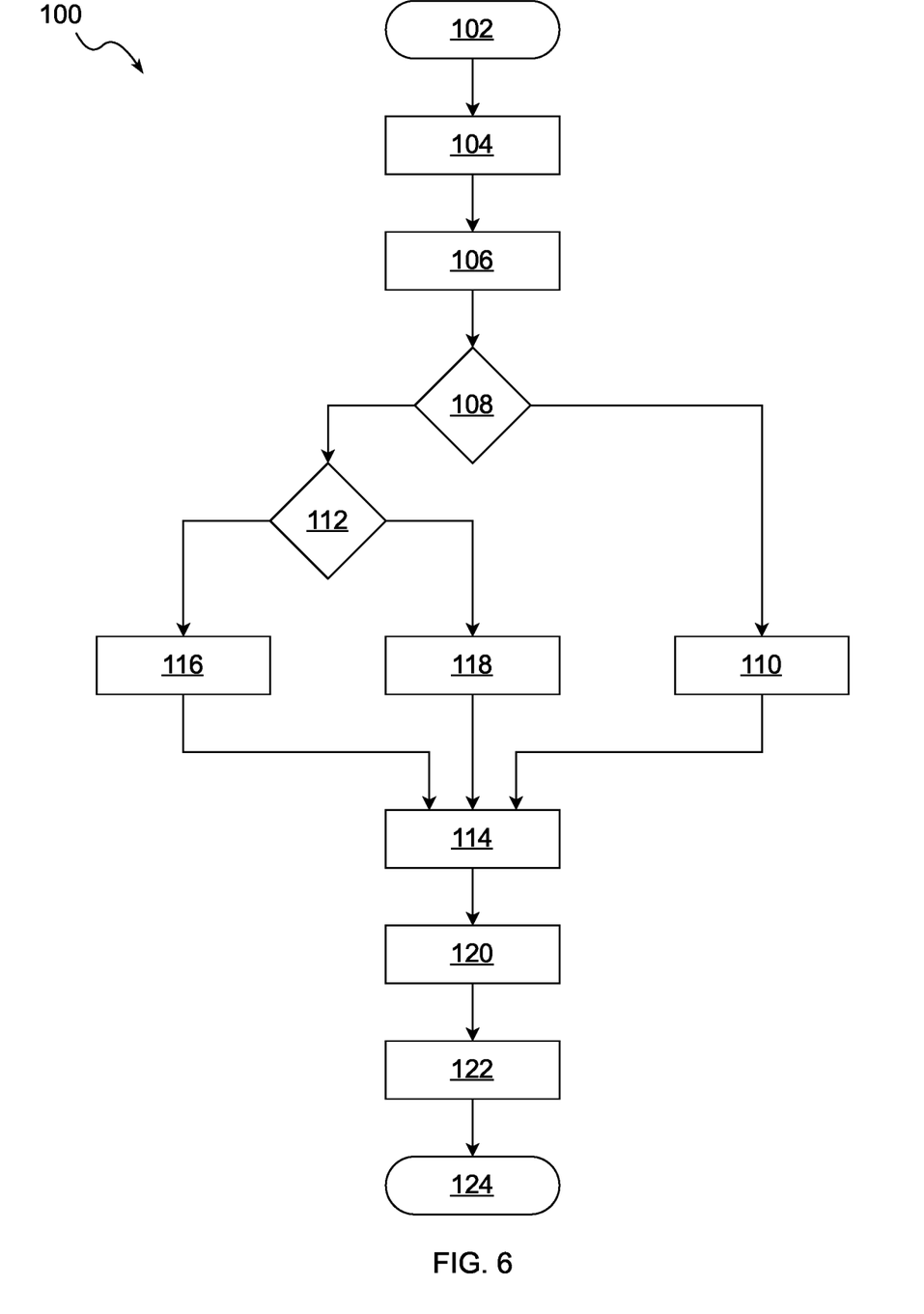
FIG. 6 is flowchart of a method for providing information to an occupant of a vehicle, according to an exemplary embodiment.

Referring to FIG. 6, a flowchart of the method 100 for providing information to the occupant 40 of the vehicle 12 is provided. The method 100 begins at block 102 and proceeds to block 104. At block 104, the controller 14 performs a plurality of measurements of the environment 30 surrounding the vehicle 12 using the plurality of vehicle sensors 16. In an exemplary embodiment, the plurality of measurements includes measurements of environmental conditions (e.g., weather, time-of-day, and the like). In an exemplary embodiment, the plurality of measurements includes measurements of roadway conditions (e.g., traffic conditions, pedestrian presence, lane marking quality, unexpected driving behaviors, traffic signal status, and the like). In another exemplary embodiment, the plurality of measurements further includes information received from the vehicle communication system 34, such as, for example, internet data, V2V data, V2X data, and/or the like. After block 104, the method 100 proceeds to block 106.

At block 106, the controller 14 determines the automation confidence level for a location of interest using the automated driving system 24. As discussed above, the location of interest is a location in the environment 30 surrounding the vehicle 12, for example, in a path of the vehicle 12 (e.g., twenty meters in front of the vehicle 12). As discussed above, the automation confidence level quantifies a confidence with which the automated driving system 24 may operate (i.e., notify the occupant 40 and/or control the vehicle 12) at the location of interest. In an exemplary embodiment, the controller 14 polls the automated driving system 24 for the automation confidence level at the location of interest. In another exemplary embodiment, the automated driving system 24 continuously transmits the automation confidence level for one or more locations of interest to the controller 14. As discussed above, the automation confidence level may be a normalized value between zero and one, with zero indicating no confidence and one indicating full confidence.

In a non-limiting example, the automation confidence level is determined based at least in part on the plurality of measurements performed at block 104. For example, in poor weather or lighting conditions, the data provided by the plurality of vehicle sensors 16 may be insufficient for the automated driving system 24 to effectively control the vehicle 12, resulting in a reduced automation confidence level. In another example, unexpected actions by remote vehicles may result in a reduced automation confidence level. After block 106, the method 100 proceeds to block 108.

At block 108, the controller 14 compares the automation confidence level determined at block 106 to a first automation confidence level threshold. In an exemplary embodiment, the first automation confidence level threshold is a high confidence threshold (e.g., 0.75). If the automation confidence level determined at block 106 is greater than or equal to the first automation confidence level threshold, the method 100 proceeds to block 110. If the automation confidence level determined at block 106 is less than the first automation confidence level threshold, the method 100 proceeds to block 112.

Referring to FIG. 5 and with continued reference to FIG. 6, at block 110, the controller 14 generates the first graphic 86*a*. In an exemplary embodiment, the first graphic 86*a* is a green arrow which indicates that the automation confidence level is relatively high for the location of interest. It should be understood that the first graphic 86*a* shown in FIG. 5 is merely exemplary in nature, and that variations in color, size, shape, and/or texture of the first graphic 86*a* are within the scope of the present disclosure. After block 110, the method 100 proceeds to block 114 as will be discussed in greater detail below.

At block 112, the controller 14 compares the automation confidence level determined at block 106 to a second automation confidence level threshold. In an exemplary embodiment, the second automation confidence level threshold is a low confidence threshold (e.g., 0.25). If the automation confidence level determined at block 106 is less than the second automation confidence level threshold, the method 100 proceeds to block 116. If the automation confidence level determined at block 106 is greater than or equal to the second automation confidence level threshold, the method 100 proceeds to block 118.

Referring to FIG. 5 and with continued reference to FIG. 6, at block 116, the controller 14 generates the second graphic 86b. In an exemplary embodiment, the second graphic 86b is a red arrow which indicates that the automation confidence level is relatively low for the location of interest. It should be understood that the second graphic 86b shown in FIG. 5 is merely exemplary in nature, and that variations in color, size, shape, and/or texture of the second graphic 86b are within the scope of the present disclosure. After block 116, the method 100 proceeds to block 114 as will be discussed in greater detail below.

Referring to FIG. 5 and with continued reference to FIG. 6, at block 118, the controller 14 generates the third graphic 86c. In an exemplary embodiment, the third graphic 86c is a yellow arrow which indicates that the automation confidence level is relatively low for the location of interest. It should be understood that the third graphic 86c shown in FIG. 5 is merely exemplary in nature, and that variations in color, size, shape, and/or texture of the third graphic 86c are within the scope of the present disclosure. After block 118, the method 100 proceeds to block 114.

At block 114, the controller 14 determines the position of the occupant 40 using the occupant position tracking device 46, as discussed above. After block 114, the method 100 proceeds to block 120.

At block 120, the controller 14 calculates the size, shape, and location of the AR-HUD graphic 42 (i.e., one of the first graphic 86a, the second graphic 86b, and the third graphic 86c) as discussed above. The location of the AR-HUD graphic 42 is chosen such that the AR-HUD graphic 42 appears overlayed on the location of interest in the environment 30 surrounding the vehicle 12 from the perspective of the occupant 40. After block 120, the method 100 proceeds to block 122.

At block 122, the controller 14 displays the AR-HUD graphic 42 (i.e., one of the first graphic 86a, the second graphic 86b, and the third graphic 86c) on the windscreen 38 of the vehicle 12 using at least one of the AR-HUD system 18 and the TWD system 20, as discussed above. In an exemplary embodiment, the controller 14 additionally uses the HMI 22 to provide an augmented view of the environment 30 surrounding the vehicle 12 including the AR-HUD graphic 42. In an exemplary embodiment, the controller 14 may notify the occupant 40 of the automation confidence level using alternative methods, such as, for example, auditory feedback, haptic feedback, and/or the like without departing from the scope of the present disclosure. After block 122, the method 100 proceeds to enter a standby state at block 124.

In an exemplary embodiment, the controller 14 repeatedly exits the standby state 124 and restarts the method 100 at block 102. In a non-limiting example, the controller 14 exits the standby state 124 and restarts the method 100 on a timer, for example, every three hundred milliseconds. By repeatedly performing the method 100, the displayed graphics are updated to account for changing roadway conditions, and additional graphics are displayed at additional locations of interest in the environment 30 surrounding the vehicle 12.

Figure 7:
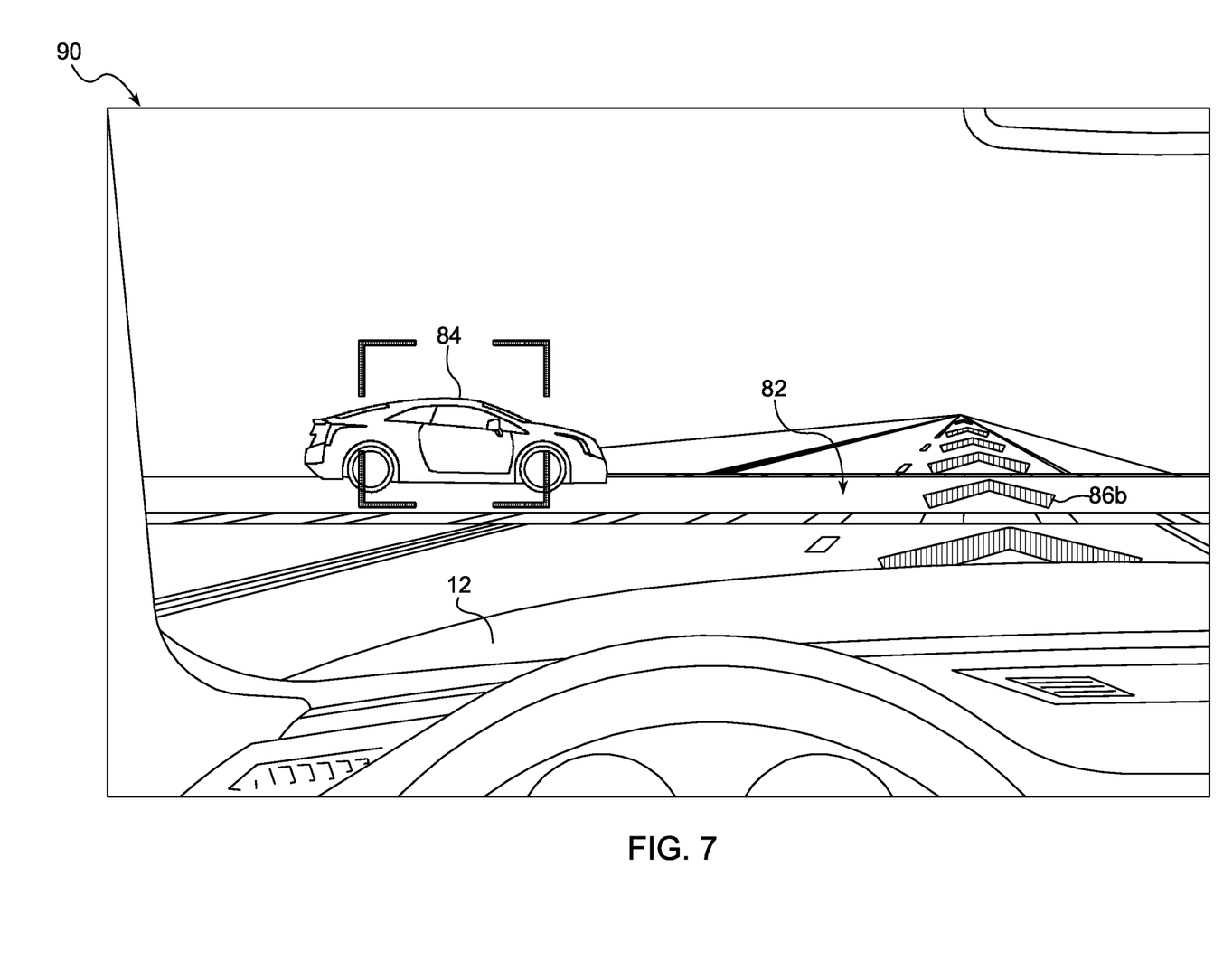
FIG. 7 is a second exemplary driving scene, according to an exemplary embodiment.

Referring to FIG. 7, a second exemplary driving scene 90 showing the system 10 and method 100 in use is shown. The second exemplary driving scene 90 includes the intersection 82 in the path of the vehicle 12. The second exemplary driving scene 90 further includes the remote vehicle 84 traversing the intersection 82. The system 10 and method 100 are used to produce the first graphic 86a and the second graphic 86b. The first graphic 86a, the second graphic 86b, and the third graphic 86c are overlayed on locations (i.e., locations of interest) of the environment 30 based on the automation confidence level, as discussed above. The second exemplary driving scene 90 is an exemplary time progression of the first exemplary driving scene 80. The remote vehicle 84 has entered further into the intersection 82 and is approaching the path of the vehicle 12. Therefore, due to repeated execution of the method 100, the graphics displayed by the AR-HUD system 18, TWD system 20, and/or HMI 22 have been updated to indicate that the occupant 40 must take control of the vehicle 12, and thus red arrows (i.e., the second graphic 86b) are displayed.

The system 10 and method 100 of the present disclosure offer several advantages. By providing information about the automation confidence level to the occupant 40 in a visual manner (i.e., through display with the AR-HUD system 18, TWD system 20, and/or HMI 22), the occupant 40 is informed about the status of the automated driving system 24. In the manual operation mode and the partially automated operation mode of the automated driving system 24, the occupant 40 is informed about when manual intervention or control of the vehicle 12 is required, thus increasing occupant awareness. In the fully automated operation mode, receiving real-time visual information about the status of the automated driving system 24 may increase occupant comfort.

The description of the present disclosure is merely exemplary in nature and variations that do not depart from the gist of the present disclosure are intended to be within the scope of the present disclosure. Such variations are not to be regarded as a departure from the spirit and scope of the present disclosure.

What is claimed is:

1. A system for providing information to an occupant of a vehicle, the system comprising:
   an automated driving system;
   a display configured to provide information to the occupant, wherein the display includes an augmented reality head-up display (AR-HUD) system including an occupant position tracking device and an AR-HUD projector; and
   a controller in electrical communication with the automated driving system and the display, wherein the controller is programmed to:
   determine an automation confidence level for a location of interest using the automated driving system, wherein the location of interest is a location in an environment surrounding the vehicle; and
   notify the occupant using the AR-HUD system based at least in part on the automation confidence level by displaying a notification graphic overlayed on the location of interest, wherein to display the notification graphic overlayed on the location of interest, the controller is further programmed to:
   compare the automation confidence level for the location of interest to a first automation confidence level threshold;

compare the automation confidence level for the location of interest to a second automation confidence level threshold;
generate a first graphic in response to determining that the automation confidence level for the location of interest is greater than or equal to the first automation confidence level threshold;
generate a second graphic in response to determining that the automation confidence level for the location of interest is less than the second automation confidence level threshold;
generate a third graphic in response to determining that the automation confidence level for the location of interest is less than the first automation confidence level threshold and greater than or equal to the second automation confidence level threshold;
determine a position of the occupant of the vehicle using the occupant position tracking device;
calculate a size, shape, and location of at least one of the first graphic, the second graphic, and the third graphic based on the position of the occupant and the location of interest; and
display at least one of the first graphic, the second graphic, and the third graphic on a windscreen of the vehicle using the AR-HUD system based on the size, shape, and location.

2. The system of claim 1, further comprising a plurality of vehicle sensors in electrical communication with the controller, wherein to determine the automation confidence level for the location of interest, the controller is further programmed to:
perform a plurality of measurements of the environment surrounding the vehicle using the plurality of vehicle sensors; and
determine the automation confidence level for the location of interest using the automated driving system based at least in part on the plurality of measurements.

3. The system of claim 2, wherein to determine the automation confidence level for the location of interest using the automated driving system, the controller is further programmed to:
determine the automation confidence level for the location of interest based at least in part on at least one of an environmental condition and a roadway condition.

4. The system of claim 1, wherein to display the notification graphic overlayed on the location of interest using the display, the controller is further programmed to:
compare the automation confidence level for the location of interest to a first automation confidence level threshold;
generate a first graphic in response to determining that the automation confidence level for the location of interest is greater than or equal to the first automation confidence level threshold;
generate a second graphic in response to determining that the automation confidence level for the location of interest is less than the first automation confidence level threshold; and
display at least one of the first graphic and the second graphic using the display.

5. The system of claim 1, wherein the first graphic includes a first distinguishing characteristic, the second graphic includes a second distinguishing characteristic, and the third graphic includes a third distinguishing characteristic, wherein the first, second, and third distinguishing characteristics include at least one of: a graphic color, a graphic size, a graphic shape, and a graphic texture, and wherein the first, second, and third distinguishing characteristics differ from each other.

6. The system of claim 1, wherein the display further includes a transparent windscreen display (TWD) system in electrical communication with the controller, wherein the TWD system includes transparent phosphors embedded in the windscreen of the vehicle and a TWD projector, and wherein to display at least one of the first graphic, the second graphic, and the third graphic, the controller is further programmed to:
calculate a size, shape, and location of at least one of the first graphic, the second graphic, and the third graphic based on the location of interest; and
display at least one of first graphic, the second graphic, and the third graphic on the windscreen of the vehicle using the TWD system based on the size, shape, and location.

7. The system of claim 1, wherein the automated driving system is configured to be used in at least one of: a manual operation mode, a partially automated operation mode, and a fully automated operation mode.

8. The system of claim 1, wherein the first graphic includes a green arrow indicating that the automation confidence level for the location of interest is greater than or equal to the first automation confidence level threshold.

9. The system of claim 8, wherein the second graphic includes a red arrow indicating that the automation confidence level for the location of interest is less than the second automation confidence level threshold.

10. The system of claim 9, wherein the third graphic includes a yellow arrow indicating that the automation confidence level for the location of interest is less than the first automation confidence level threshold and greater than or equal to the second automation confidence level threshold.

11. The system of claim 2, wherein the plurality of measurements includes at least one of: measurements of environmental conditions, measurements of roadway conditions, and information received from external systems.

12. A method for providing information to an occupant of a vehicle, the method comprising:
determining an automation confidence level for a location of interest using an automated driving system, wherein the location of interest is a location in an environment surrounding the vehicle; and
notifying the occupant using a display based at least in part on the automation confidence level by displaying a notification graphic overlayed on the location of interest using the display, wherein displaying the notification graphic overlayed on the location of interest using the display further comprises:
comparing the automation confidence level for the location of interest to a first automation confidence level threshold;
comparing the automation confidence level for the location of interest to a second automation confidence level threshold;
generating a first graphic in response to determining that the automation confidence level for the location of interest is greater than or equal to the first automation confidence level threshold;
generating a second graphic in response to determining that the automation confidence level for the location of interest is less than the second automation confidence level threshold;

generating a third graphic in response to determining that the automation confidence level for the location of interest is less than the first automation confidence level threshold and greater than or equal to the second automation confidence level threshold;
determining a position of a driver of the vehicle using a driver position tracking device;
calculating a size, shape, and location of at least one of the first graphic, the second graphic, and the third graphic based on the position of the driver and the location of interest;
displaying at least one of the first graphic, the second graphic, and the third graphic on a windscreen of the vehicle using an augmented reality head up display (AR-HUD) projector based on the size, shape, and location; and
displaying at least one of the first graphic, the second graphic, and the third graphic on the windscreen of the vehicle using a transparent windscreen display (TWD) system based on the size, shape, and location.

13. The method of claim 12, wherein determining the automation confidence level for the location of interest further comprises:
performing a plurality of measurements of the environment surrounding the vehicle using a plurality of vehicle sensors; and
determining the automation confidence level for the location of interest using the automated driving system based at least in part on the plurality of measurements.

14. The method of claim 13, wherein determining the automation confidence level for the location of interest further comprises:
determining the automation confidence level for the location of interest based at least in part on at least one of: a traffic condition in the environment surrounding the vehicle, a pedestrian presence in the environment surrounding the vehicle, and a roadway condition in the environment surrounding the vehicle.

15. The method of claim 12, wherein displaying the notification graphic overlayed on the location of interest using the display further comprises:
comparing the automation confidence level for the location of interest to a first automation confidence level threshold;
generating a first graphic in response to determining that the automation confidence level for the location of interest is greater than or equal to the first automation confidence level threshold;
generating a second graphic in response to determining that the automation confidence level for the location of interest is less than the first automation confidence level threshold; and
displaying at least one of the first graphic and the second graphic using the display.

16. The method of claim 12, wherein generating the first graphic further comprises:
generating the first graphic, wherein the first graphic includes a green arrow indicating that in response to determining that the automation confidence level for the location of interest is greater than or equal to the first automation confidence level threshold.

17. The method of claim 16, wherein generating the second graphic further comprises:
generating the second graphic, wherein the second graphic includes a red arrow indicating that the automation confidence level for the location of interest is less than the second automation confidence level threshold.

18. The method of claim 17, wherein generating the third graphic further comprises:
generating the third graphic, wherein the third graphic includes a yellow arrow indicating that the automation confidence level for the location of interest is less than the first automation confidence level threshold and greater than or equal to the second automation confidence level threshold.

19. A system for providing information to an occupant of a vehicle, the system comprising:
an automated driving system;
an augmented reality head-up display (AR-HUD), wherein the AR-HUD includes an occupant position tracking device and an AR-HUD projector;
a plurality of vehicle sensors including at least a camera system, a vehicle communication system, and a global navigation satellite system (GNSS); and
a controller in electrical communication with the automated driving system, the AR-HUD, and the plurality of vehicle sensors, wherein the controller is programmed to:
perform a plurality of measurements of an environment surrounding the vehicle using the plurality of vehicle sensors, wherein the plurality of measurements includes at least one of: a traffic condition in the environment surrounding the vehicle, a pedestrian presence in the environment surrounding the vehicle, and a roadway condition in the environment surrounding the vehicle;
determine an automation confidence level for a location of interest using the automated driving system based at least in part on the plurality of measurements; and
notify the occupant using the AR-HUD based at least in part on the automation confidence level, wherein to notify the occupant using the AR-HUD, the controller is further programmed to:
compare the automation confidence level for the location of interest to a first automation confidence level threshold;
compare the automation confidence level for the location of interest to a second automation confidence level threshold;
generate a first graphic in response to determining that the automation confidence level for the location of interest is greater than or equal to the first automation confidence level threshold;
generate a second graphic in response to determining that the automation confidence level for the location of interest is less than the second automation confidence level threshold;
generate a third graphic in response to determining that the automation confidence level for the location of interest is less than the first automation confidence level threshold and greater than or equal to the second automation confidence level threshold; and
determine a position of the occupant of the vehicle using the occupant position tracking device;
calculate a size, shape, and location of at least one of the first graphic, the second graphic, and the third graphic based on the position of the occupant and the location of interest; and
display at least one of the first graphic, the second graphic, and the third graphic on a windscreen of the vehicle using the AR-HUD system based on the size, shape, and location.

20. The system of claim 19, wherein the first graphic includes a first distinguishing characteristic, the second graphic includes a second distinguishing characteristic, and the third graphic includes a third distinguishing characteristic, wherein the first, second, and third distinguishing characteristics include at least one of: a graphic color, a graphic size, a graphic shape, and a graphic texture, and wherein the first, second, and third distinguishing characteristics differ from each other.

21. The system of claim 20, wherein the first graphic includes a green arrow, the second graphic includes a red arrow, and the third graphic includes a yellow arrow.

* * * * *